US008677239B2

(12) United States Patent  (10) Patent No.: US 8,677,239 B2
Jeong  (45) Date of Patent: Mar. 18, 2014

(54) ELECTRONIC ALBUM AND METHOD FOR REPLAYING ELECTRONIC ALBUM

(75) Inventor: Guen-ho Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 799 days.

(21) Appl. No.: 12/535,118

(22) Filed: Aug. 4, 2009

(65) Prior Publication Data

US 2010/0058187 A1  Mar. 4, 2010

(30) Foreign Application Priority Data

Sep. 4, 2008 (KR) .................. 10-2008-0087416

(51) Int. Cl.
G06F 3/00 (2006.01)

(52) U.S. Cl.
USPC ........................................... 715/716

(58) Field of Classification Search
USPC ......... 715/200–203, 209, 704, 705, 716, 720, 715/723, 730–732, 808–809, 838, 863–864
See application file for complete search history.

(56) References Cited

U.S. PATENT DOCUMENTS

| 5,574,519 | A | * | 11/1996 | Manico et al. ............... 396/429 |
| 5,966,122 | A | * | 10/1999 | Itoh ............................. 715/838 |
| 6,008,807 | A | * | 12/1999 | Bretschneider et al. ...... 715/732 |
| 6,084,582 | A | * | 7/2000 | Qureshi et al. ............... 715/243 |
| 6,097,389 | A | * | 8/2000 | Morris et al. ................ 715/804 |
| 6,199,076 | B1 | * | 3/2001 | Logan et al. ................. 715/203 |
| 6,301,586 | B1 | * | 10/2001 | Yang et al. ..................... 1/1 |
| 7,356,763 | B2 | * | 4/2008 | Lin et al. ..................... 715/205 |
| 7,617,107 | B2 | * | 11/2009 | Nagai .......................... 704/270 |
| 7,734,154 | B2 | * | 6/2010 | Seo et al. ..................... 386/241 |
| 2004/0122539 | A1 | * | 6/2004 | Ainsworth ................... 700/94 |
| 2004/0165867 | A1 | * | 8/2004 | Seo et al. ..................... 386/96 |
| 2004/0199866 | A1 | * | 10/2004 | Deshpande ............... 715/500.1 |
| 2004/0252978 | A1 | * | 12/2004 | Jung et al. .................... 386/96 |
| 2005/0283741 | A1 | * | 12/2005 | Balabanovic et al. ....... 715/838 |
| 2006/0177153 | A1 | * | 8/2006 | King et al. .................... 382/305 |
| 2006/0200744 | A1 | * | 9/2006 | Bourke et al. ............ 715/500.1 |
| 2006/0245805 | A1 | * | 11/2006 | Takakuwa et al. ............. 400/62 |
| 2007/0174759 | A1 | * | 7/2007 | Ando et al. ............... 715/500.1 |
| 2008/0016491 | A1 | * | 1/2008 | Doepke ........................ 717/104 |
| 2008/0133034 | A1 | * | 6/2008 | Pauws et al. .................. 700/94 |
| 2008/0235591 | A1 | * | 9/2008 | Krantz et al. ................. 715/730 |
| 2009/0249210 | A1 | * | 10/2009 | Sheldon et al. ............... 715/730 |
| 2009/0271692 | A1 | * | 10/2009 | Liu et al. ..................... 715/202 |

FOREIGN PATENT DOCUMENTS

JP  2006-018020 A  1/2006
KR  10-0774178  5/2006

* cited by examiner

Primary Examiner — Enrique Iturralde
(74) Attorney, Agent, or Firm — Sughrue Mion, PLLC

(57) ABSTRACT

An electronic album and a method for replaying the electronic album are provided. The method for replaying the electronic album includes determining whether a predetermined command is received, and replaying an image file and audio file simultaneously, if it is determined that the predetermined command is received. Hence, it is possible for a user to utilize image and audio files which are automatically replayed simultaneously.

22 Claims, 4 Drawing Sheets

FIG. 4A
| Image files | Audio files |
|---|---|
| JPG 1 | Audio 1 |
| JPG 2 | Audio 2 |
| ⋮ | ⋮ |
| JPG 15 | Audio 7 |
FIG. 4B
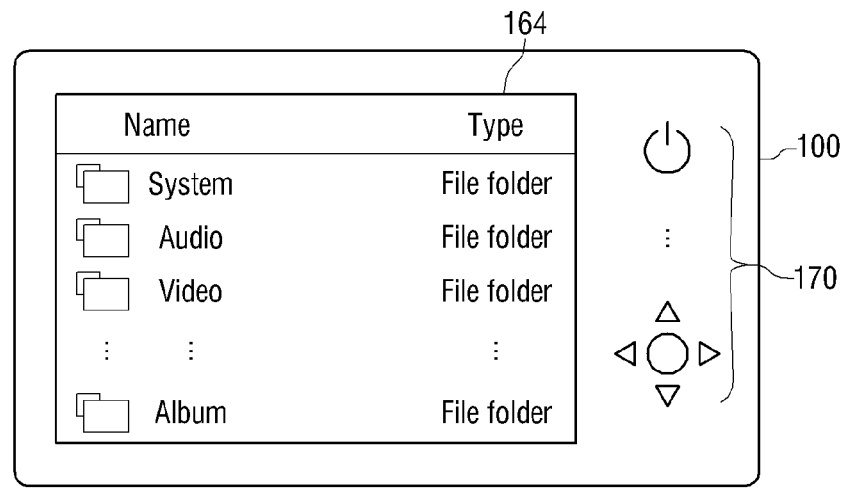
FIG. 4C
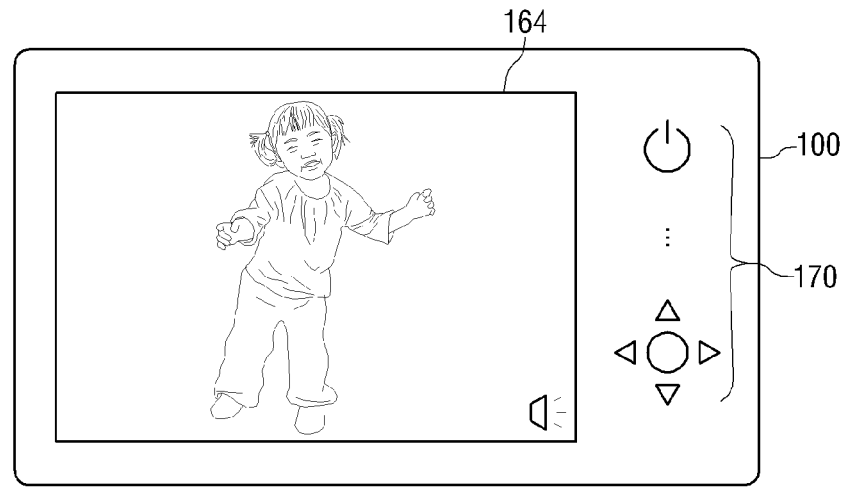

ELECTRONIC ALBUM AND METHOD FOR REPLAYING ELECTRONIC ALBUM

CROSS-REFERENCE TO RELATED APPLICATIONS

This application claims priority from Korean Patent Application No. 10-2008-0087416, filed on Sep. 4, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to providing an electronic album and replaying the electronic album.

2. Description of the Related Art

Recently, as various digital image techniques have developed, it has become possible to capture photographs or moving images using diverse digital devices, including digital cameras, camcorders and cellular phones which generate digital image data.

Just as related art photographs formed by printing a film, image data generated by digital devices can be printed on photographic paper or other forms of paper so as to be used like related art photographs. Additionally, image data can be stored on a storage medium to be used as an electronic album.

The electronic album service allows image data in a digital file form to be displayed on a screen and a user to directly edit the image data using an editing program. Here, the image data is stored in a built-in memory or a removable memory.

An electronic album can store a larger number of photographs than a related art album, and, in particular, can store a large quantity of image data on a compact disc (CD). Accordingly, an electronic album is convenient to carry and takes up a smaller space than a related art album.

Additionally, as electronic album functions have diversified, electronic albums have become capable of storing not only image data but also audio data, so it is possible to provide users with various services.

However, if a user desires to use both image data and audio data on the electronic album, he or she needs to enter not only a command to display the image data but also a separate command to output the audio data.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an electronic album which is able to automatically replay image files and audio files simultaneously, and a method for replaying the electronic album.

According to an aspect of the present invention, there is provided a method for replaying an electronic album, the method comprising determining whether a predetermined command to execute a function of an electronic story album is received; and replaying an audio of an audio file stored in an album folder provided to execute the function of the electronic story album while displaying an image of an image file stored in the album folder on a screen, if it is determined that the predetermined command is received.

The replaying may comprise subsequently replaying all image files stored in the album folder while subsequently replaying all audio files stored in the album folder.

The replaying may comprise, if the image files or the audio files have all been replayed, automatically replaying the image files or the audio files again.

The replaying may comprise, if the image files or the audio files have all been replayed, providing a message asking whether to replay the image files or the audio files again from the start; and if a repeat command is received, replaying the image files or the audio files again from the start.

The method may further comprise, if the album folder does not include image files, providing a message stating that no image files to be used to execute the function of the electronic story album are stored.

The method may further comprise, if the album folder does not include audio files, providing a message stating that no audio files to be used to execute the function of the electronic story album are stored.

The method may further comprise, if the album folder does not include both image files and audio files, providing a message stating that no image files and audio files to be used to execute the function of the electronic story album are stored.

The predetermined command may comprise a command to initiate the function of the electronic story album, or a command to open the album folder.

The method may further comprise storing in the album folder at least one image file or at least one audio file provided by at least one storage medium or by at least one e-mail message.

The method may further comprise copying at least one image file or at least one audio file stored in a separately provided folder to the album folder.

According to another aspect of the present invention, there is provided an electronic album comprising a display unit which displays an image, an audio output unit which outputs audio, a manipulating unit which receives a predetermined command to execute a function of an electronic story album, and a control unit which, if an image file and audio file are stored in an album folder provided to execute the function of the electronic story album, controls such that an image file is replayed and an image corresponding to the image file is displayed on the display unit and an audio file is replayed and audio corresponding to the audio file is output through the audio output unit.

The controller may control the display unit and the audio output unit to subsequently replay all image files stored in the album folder and simultaneously to subsequently replay all audio files stored in the album folder.

If the image files or the audio files have all been replayed, the controller may control the display unit and the audio output unit to automatically replay the image files or the audio files again.

If the image files or the audio files have all been replayed, the controller may control the display unit and the audio output unit to provide a message asking whether to replay the image files or the audio files again from the start. If a repeat command is received, the controller may control the display unit and the audio output unit to replay the image files or the audio files again from the start.

If the album folder does not include image files, the controller may control the display unit and the audio output unit to provide a message stating that no image files to be used to execute the function of the electronic story album are stored.

If the album folder does not include audio files, the controller may control the display unit and the audio output unit to provide a message stating that no audio files to be used to execute the function of the electronic story album are stored.

If the album folder does not include both image files and audio files, the controller may control the display unit and the audio output unit to provide a message stating that no image files and audio files to be used to execute the function of the electronic story album are stored.

The predetermined command may comprise a command to initiate the function of the electronic story album, or a command to open the album folder.

The album folder may store at least one image file or at least one audio file provided by at least one storage medium or by at least one e-mail message.

At least one image file or at least one audio file stored in a separately provided folder may be copied and stored in the album folder.

According to another aspect of the present invention, there is provided an electronic album comprising a data memory which stores an album folder created in a predetermined position to execute a function of an electronic story album, a manipulating unit which receives a predetermined command to execute the function of the electronic story album, a decoding unit which decodes an image file and an audio file, a signal processing unit which converts the image file and audio file output from the decoding unit into signals able to be output, a signal output unit which outputs an image and audio according to the type of signal output from the signal processing unit, and a control unit which, if the predetermined command is received by the manipulating unit, controls the decoding unit, the signal processing unit and the signal output unit such that an image file stored in the album folder is replayed and an image corresponding to the image file is displayed and an audio file stored in the album folder is replayed at the same time.

The predetermined command may be received through a predetermined hot key or a predetermined on-screen-display (OSD) menu.

BRIEF DESCRIPTION OF THE DRAWINGS

The above and/or other aspects of the present invention will be more apparent by describing certain exemplary embodiments of the present invention with reference to the accompanying drawings, in which:

FIGS. 4A to 4C exemplarily illustrate an album folder of an electronic album according to an exemplary embodiment of the present invention.

DETAILED DESCRIPTION OF EXEMPLARY EMBODIMENTS

Figure 1:
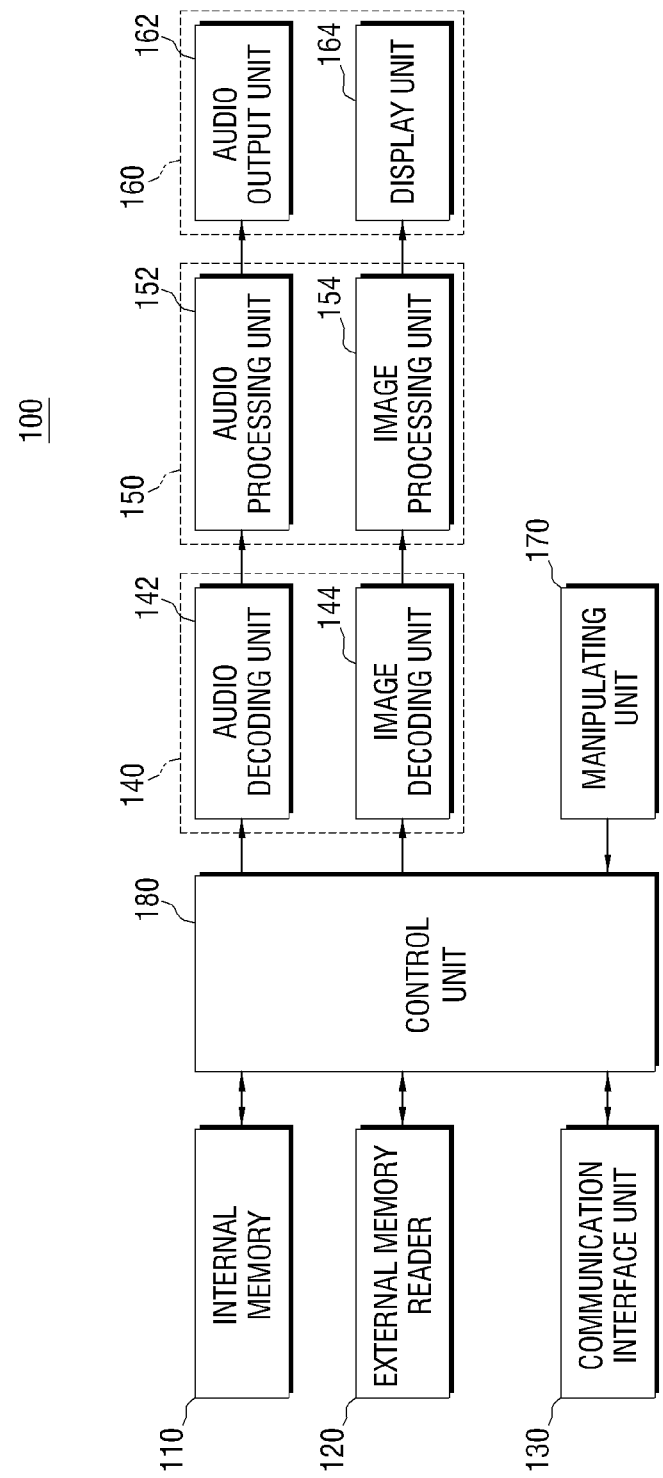
FIG. 1 is a block diagram of an electronic album to which the present invention is applicable.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of an electronic album 100 to which an exemplary embodiment of the present invention is applicable. The electronic album 100 of FIG. 1 comprises an internal memory 110, an external memory reader 120, a communication interface unit 130, a decoding unit 140, a signal processing unit 150, a signal output unit 160, a manipulating unit 170 and a control unit 180.

The internal memory 110 comprises a program memory which stores program information required to control the electronic album 100, and a data memory which stores content, menu information and icon information. The internal memory 110 may be implemented as a read only memory (ROM), a flash memory and a random access memory (RAM). The content may comprise image and audio files.

The external memory reader 120 reads-out data such as an image file or audio file from an external memory card which is detachably mounted in the electronic album 100, and stores the read-out data in the internal memory 110 or transfers the read-out data to the control unit 180. The external memory card may be, for example, a Compact Flash (CF) card, a MultiMedia Card (MMC), a Secure Digital (SD) card, a Smart Media Card (SMC), a Memory Stick (MS), an xD-Picture card, a miniSD card, a T-flash card or a reduced size (RS)-MMC.

The communication interface unit 130 performs data communication with an external apparatus, and receives image and/or audio files from the external apparatus, and transfers the received files to the internal memory 110 or the control unit 180. The external apparatus may be a camcorder, a personal computer (PC) or a digital camera. Specifically, the electronic album 100 may download image and/or audio files by e-mail using the communication interface unit 130. The communication interface unit 130 may be implemented as a local area network (LAN) card.

The decoding unit 140 performs signal processing on the image and/or audio files to be decompressed or replayed. The decoding unit 140 comprises an audio decoding unit 142 and an image decoding unit 144. Specifically, the audio decoding unit 142 decompresses audio files output from the internal memory 110, the external memory reader 120 or the communication interface unit 130, and transfers the decompressed audio files to an audio processing unit 152 of the signal processing unit 150. The image decoding unit 144 decompresses image files output from the internal memory 110, the external memory reader 120 or the communication interface unit 130, and transfers the decompressed image files to an image processing unit 154 of the signal processing unit 150.

The signal processing unit 150 converts an input signal into a signal able to be output. The signal processing unit 150 comprises the audio processing unit 152 and the image processing unit 154. Specifically, the audio processing unit 152 converts a digital audio signal output from the decoding unit 140 into an analog audio signal, and outputs the converted analog audio signal to an audio output unit 162 of the signal output unit 160. The image processing unit 154 performs signal processing such as scaling on an image output from the decoding unit 140, and outputs the processed image to a display unit 164 of the signal output unit 160.

The signal output unit 160 comprises the audio output unit 162 which outputs audio corresponding to an audio file, and the display unit 164 which displays an image corresponding to an image file.

In the exemplary embodiment of the present invention, the decoding unit 140, the signal processing unit 150 and the signal output unit 160 are collectively referred to as a "replay unit", as they are able to receive files from the internal memory 110, the external memory reader 120 or the communication interface unit 130 and to replay the received files.

The manipulating unit 170 receives user commands and transfers the received user commands to the control unit 180.

The control unit 180 controls the entire operation of the electronic album 100. Specifically, if a user command is input through the manipulating unit 170, the control unit 180 controls various function blocks of the electronic album 100 to perform a function corresponding to the input command. For example, if a user enters a command to select one from a plurality of folders displayed on the display unit 164, the control unit 180 may control the replay unit to display names of files included in the selected folder on the display unit 164 or to replay the files stored in the folder.

In this situation, the plurality of folders may comprise an audio folder, a video folder, an image folder and an album folder. The audio folder, the video folder and the image folder may include audio files, video files and image files, respectively.

The album folder may desirably include not only image files but also audio files. Accordingly, if a user enters a command to select the album folder, the control unit 180 may control such that image files stored in the album folder may be replayed in sequence and at the same time audio files stored in the album folder may be replayed in sequence. Additionally, if the user enters the command to select the album folder, but if the album folder does not include one or both of image files and audio files, the control unit 180 may generate a message stating that no image files and/or audio files are stored, and display the generated message on the display unit 164.

The image and audio files stored in the album folder may be downloaded from the internal memory 110 or an external memory, or an external apparatus (for example, an e-mail server). Additionally, the album folder may be set in advance, or may be designated by a user.

Figure 2:
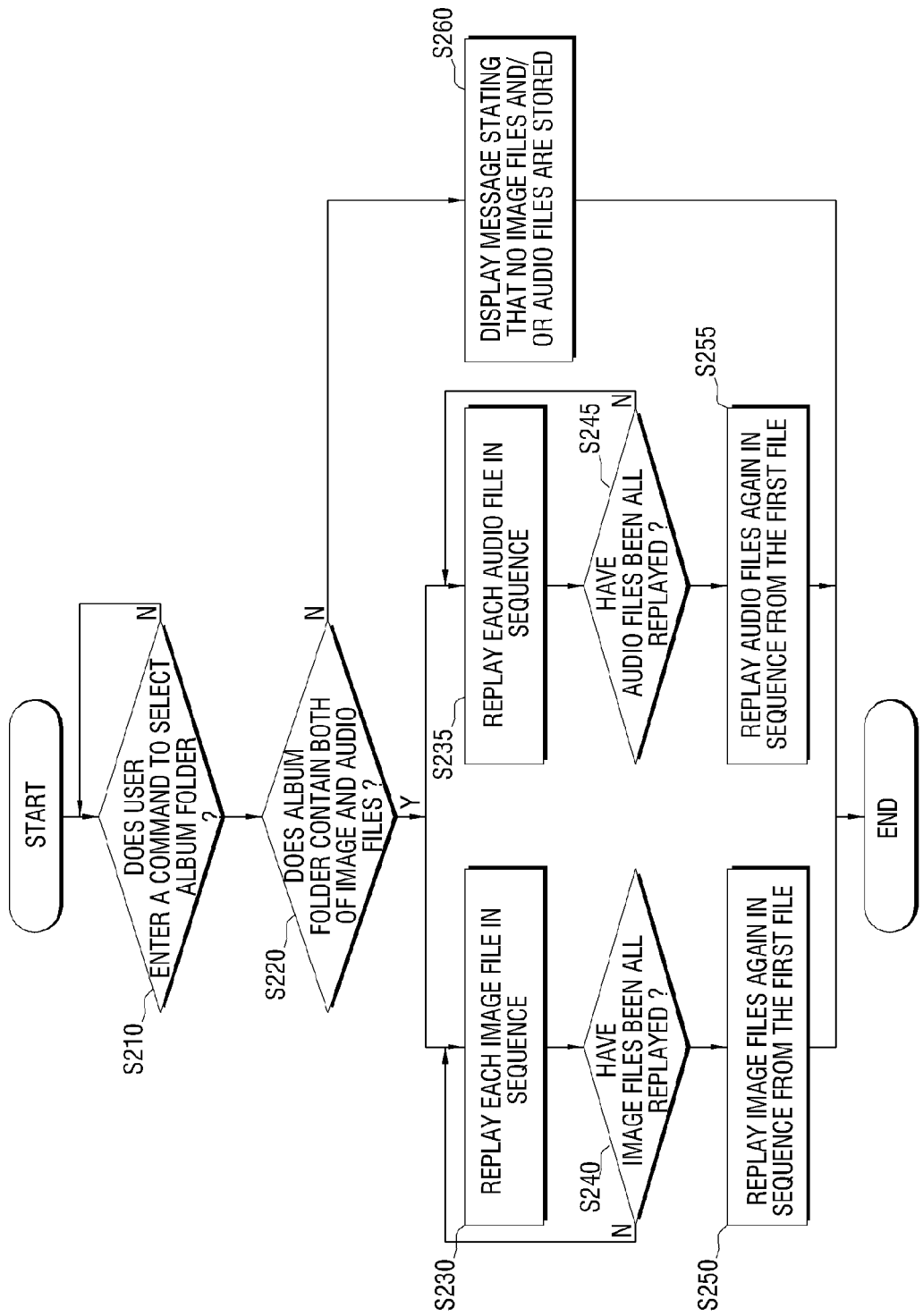
FIG. 2 is a flowchart explaining a process for executing a function of an album folder according to an exemplary embodiment of the present invention.

FIG. 2 is a flowchart explaining a process for executing a function of an album folder according to an exemplary embodiment of the present invention.

In FIG. 2, a user enters a command to select the album folder (S210). In more detail, the display unit 164 displays a plurality of folders including the album folder, and the user may enter the command to select the album folder from among the plurality of folders using the manipulating unit 170.

If the album folder is selected in response to the command to select the album folder (S210-Y), the control unit 180 determines whether both image files and audio files are stored in the album folder (S220). Since the album folder has a function of replaying audio files and image files, the album folder requires both image files and audio files to be stored therein.

If it is determined that both the image files and audio files are stored in the album folder (S220-Y), the control unit 180 controls the replay unit to replay each of the image files in sequence (S230). While replaying the image files, the control unit 180 also controls the replay unit to replay each of the audio files in sequence (S235).

The album folder may contain a plurality of image files and a plurality of audio files. The control unit 180 controls the replay unit to replay one of the plurality of image files, and if the image file has been completely replayed, the control unit 180 controls the replay unit to replay another image file. Additionally, the control unit 180 may control the replay unit to replay the plurality of image files in an order that the plurality of image files are stored or in an order of preference. The control unit 180 controls the replay of the plurality of audio files in the same manner as described above, so no further description thereof is required.

It is not necessary for a single image file from the album folder to be displayed for the same duration as a single audio file is replayed. For example, each of the plurality of image files may be displayed on the display unit 164 for one minute, and each of the plurality of audio files may be output through the audio output unit 162 for three to five minutes. Accordingly, the time at which the plurality of image files stored in the album folder have all been displayed may differ from the time at which the plurality of audio files stored in the album folder have all been replayed.

The control unit 180 determines whether the plurality of image files in the album folder have all been replayed (S240). If it is determined that the plurality of image files have all been replayed (S240-Y), the control unit 180 controls the replay unit to replay the plurality of image files again in order from the first image file (S250).

Additionally, the control unit 180 determines whether the plurality of audio files in the album folder have all been replayed (S245). If it is determined that the plurality of audio files have all been replayed (S245-Y), the control unit 180 controls the replay unit to replay the plurality of audio files again in order from the first audio file (S255).

By contrast, if it is determined that the album folder does not include one or both of image files and audio files (S220-N), the control unit 180 generates a message stating that no image files and/or audio files are stored, and displays the generated message on the display unit 164 (S260).

The function of the album folder may be performed only when both the image files and audio files are stored therein. Accordingly, if only one of image files and audio files are stored in the album folder, the control unit 180 may provide a user with information regarding the type of file that is absent from the album folder, in order to persuade the user to fully utilize the function of the album folder.

As described above, if the album folder is selected, the plurality of image files in the album folder may be displayed individually in sequence in the manner of a slideshow, and at the same time the plurality of audio files in the album folder may be replayed as background audio. Thus, the user is able to enjoy various functions of the electronic album 100.

Additionally, according to the selection of the album folder, the electronic album 100 may display the plurality of image files while replaying the plurality of audio files without any further commands, and thus it is possible for a user to conveniently view images while listening to audio.

In the exemplary embodiment of the present invention, if the image and/or audio files stored in the album folder are completely replayed, the image and/or audio files may be replayed automatically again from the first file, however there is no limitation thereto.

Figure 3:
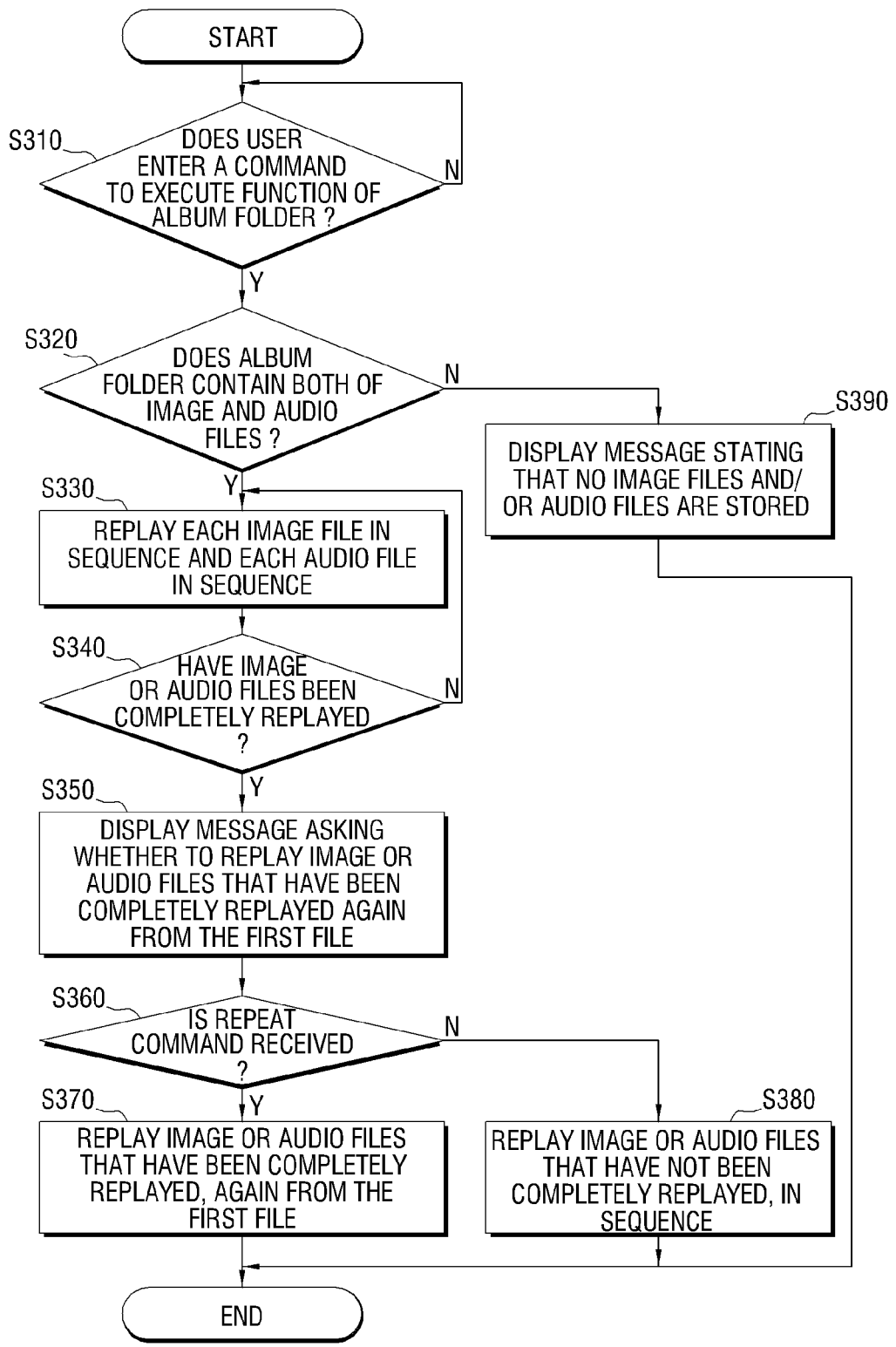
FIG. 3 is a flowchart explaining a process for executing a function of an album folder according to another exemplary embodiment of the present invention.

FIG. 3 is a flowchart explaining a process for executing a function of an album folder according to another exemplary embodiment of the present invention.

In FIG. 3, a user enters a command to execute the function of the album folder (S310). In more detail, the user may press a key denoted by "Album" on the manipulating unit 170 to input the command to execute the function of the album folder.

It should be noted that while the exemplary embodiment of FIG. 3 shows a single "Album" folder, the present invention is not limited thereto. One of skill in the art would recognize that the image and audio files of the present invention can be stored and organized in different ways. For example, images may be stored in one folder and audio files may be stored in another folder, and if a user enters a command to execute the function of the album folder (S310), both folders could be parsed; or images and images and audio files may be stored in subfolders of the "Album" folder, in which case operation S310 could include a parsing of the respective subfolders to locate the appropriate image and audio files. However, these are merely examples, and the present invention is not limited thereto.

If it is determined that the command to execute the function of the album folder is received (S310-Y), the control unit 180 determines whether both image files and audio files are stored in the album folder (S320). Alternatively, as noted above, an exemplary embodiment of the present invention may include more than one folder, in which case multiple folders would have to be checked as to whether both the image files and the audio files are stored in the respective folders.

If it is determined that both the image files and audio files are stored in the album folder (S320-Y), the control unit 180 controls the replay unit to replay each of the image files and each of the audio files in sequence (S330). The sequence may be according to an order in which the image files and/or the audio files are stored, or based on some other order or organization of the image and/or audio files.

The control unit 180 then determines whether the image files or audio files stored in the album folder have been completely replayed (S340).

If it is determined that the image files or audio files have been completely replayed (S340-Y), the control unit 180 generates a message asking whether to replay the image files or audio files that have been completely replayed again from the first file, and displays the generated message on the display unit 164 (S350). Accordingly, the user may decide whether to repeat replaying the image files or audio files through the displayed message.

If the user additionally enters a repeat command (S360-Y), the control unit 180 controls the replay unit to replay the image files or audio files that have been completely replayed again from the first file (S370).

If the repeat command is not received (S360-N), the control unit 180 controls the replay unit to replay in sequence one or both of the image files and audio files that have not been completely replayed (S380).

If it is determined that the album folder does not include one or both of image files and audio files (S320-N), the control unit 180 generates a message stating that no image files and/or audio files are stored, and displays the message on the display unit 164 (S390).

While the control unit 180 generates a message stating that no image files and/or audio files are stored and a message asking whether to reply the image files or audio files that have been completely replayed again from the first file in the exemplary embodiment of the present invention, there is no limitation thereto. Accordingly, it is also possible to provide a user with information by outputting audio signals instead of visual messages.

FIGS. 4A to 4C exemplarily illustrate an album folder of the electronic album 100 according to an exemplary embodiment of the present invention.

In FIG. 4A, the album folder stores one or more downloaded image files and one or more downloaded audio files. A user may download desired image files or audio files from the internal memory 110 or an external memory, or from an e-mail, and may store the downloaded files in the album folder. Additionally, there is no need to match the number of image files to the number of audio files, and there is no need for image or audio files to have the same replaying time.

If a user enters a command to display folders available in the electronic album 100, a system folder, an audio folder, a video folder and an album folder are displayed on the display unit 164, as shown in FIG. 4B. If the user selects the audio folder through the display unit 164 using a key on the manipulating unit 170, a list of audio files in the audio folder may be displayed although not illustrated in drawings. In this situation, if the user enters a command to select a predetermined audio file in the displayed list, the predetermined audio file may be replayed.

Additionally, if the user enters a command to select the album folder or a command to execute the function of the album folder, the image files in the album folder may be displayed individually in sequence in the manner of a slideshow and at the same time the audio files may be replayed, rather than a list of the image files and a list of audio files being displayed.

Therefore, if the album folder is selected, the electronic album 100 may simultaneously replay the image files and audio files in the album folder without any further commands being input, so user convenience may be increased.

While the process by which the electronic album 100 replays image files and audio files stored in a single folder has been described using the expressions "album folder" and "function of the album folder" in the exemplary embodiment of the present invention for convenience of description, there is no limitation to such expressions. Accordingly, the present invention is also applicable to functions capable of replaying image files and audio files stored in a single folder.

Furthermore, as noted above, while the image files and audio files may be stored in a single folder, the present invention is also applicable to image files and audio files stored in different folders.

Additionally, the electronic album 100 has been described in the exemplary embodiment of the present invention. The electronic album 100 may be a dedicated apparatus, or any displaying apparatus, which comprises an audio output unit and a display unit and which is able to replay image files and audio files using folders, as an electronic album regardless of the name thereof.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for replaying an electronic album, the method comprising:
   displaying an album folder;
   determining whether a predetermined command to execute a function of an electronic story album is received;
   determining whether both an image file and an audio file are stored in the album folder if it is determined that the predetermined command is received; and
   replaying an audio of the audio file stored in the album folder for a first duration while displaying an image of the image file stored in the album folder on a screen for a second duration, if it is determined that both the image file and the audio file are stored in the album folder,
   wherein the first duration is independent of the second duration, wherein the replaying comprises replaying image files stored in the album folder while replaying audio files stored in the album folder, and wherein the replaying comprises determining whether the image files or the audio files have been completely replayed, and providing a message asking whether to replay the image files or the audio files again from the start if it is determined that the image files or the audio files have been completely replayed, and if a repeat command is received, replaying the image files or the audio files that have been completely replayed again from the start.

2. The method as claimed in claim 1, further comprising:
if the album folder does not include image files, providing a message stating that no image files to be used to execute the function of the electronic story album are stored.

3. The method as claimed in claim 1, further comprising:
if the album folder does not include audio files, providing a message stating that no audio files to be used to execute the function of the electronic story album are stored.

4. The method as claimed in claim 1, further comprising:
if the album folder does not include both image files and audio files, providing a message stating that no image files and audio files to be used to execute the function of the electronic story album are stored.

5. The method as claimed in claim 1, wherein the predetermined command comprises a command to initiate the function of the electronic story album, or a command to open the album folder.

6. The method as claimed in claim 1, further comprising:
storing in the album folder at least one image file or at least one audio file provided by at least one storage medium or by at least one e-mail message.

7. The method as claimed in claim 1, further comprising:
copying at least one image file or at least one audio file stored in a separately provided folder to the album folder.

8. The method as claimed in claim 1, wherein the first duration is determined by the length of the audio file and the second duration is set by a user.

9. The method as claimed in claim 1, wherein the replaying comprises replaying files that have not been completely replayed among the image files and the audio files if the repeat command is not received.

10. An electronic album apparatus, comprising:
a display unit which displays an album folder;
an audio output unit which outputs audio;
a manipulating unit which receives a predetermined command to execute a function of an electronic story album; and
a control unit which, if the manipulating unit receives the predetermined command, determines whether both an image file and an audio file are stored in the album folder, and if it is determined that both the image file and the audio file are stored in the album folder, controls such that the image file is replayed and an image corresponding to the image file is displayed on the display unit for a second duration and the audio file is replayed and audio corresponding to the audio file is output through the audio output unit for a first duration,
wherein the first duration is independent of the second duration,
wherein the controller controls the display unit and the audio output unit to replay image files stored in the album folder and to replay audio files stored in the album folder, and
wherein the controller determines whether the image files or the audio files have been completely replayed, and controls the display unit or the audio output unit to provide a message asking whether to replay the image files or the audio files that have been completely replayed again from the start if it is determined that the image files or the audio files have been completely replayed, and if a repeat command is received, the controller controls the display unit or the audio output unit to replay the image files or the audio files that have been completely replayed again from the start.

11. The electronic album apparatus as claimed in claim 10, wherein, if the album folder does not include image files, the controller controls the display unit and the audio output unit to provide a message stating that no image files to be used to execute the function of the electronic story album are stored.

12. The electronic album apparatus as claimed in claim 10, wherein, if the album folder does not include audio files, the controller controls the display unit and the audio output unit to provide a message stating that no audio files to be used to execute the function of the electronic story album are stored.

13. The electronic album apparatus as claimed in claim 10, wherein, if the album folder does not include both image files and audio files, the controller controls the display unit and the audio output unit to provide a message stating that no image files and audio files to be used to execute the function of the electronic story album are stored.

14. The electronic album apparatus as claimed in claim 10, wherein the predetermined command comprises a command to initiate the function of the electronic story album, or a command to open the album folder.

15. The electronic album apparatus as claimed in claim 10, wherein the album folder stores at least one image file or at least one audio file provided by at least one storage medium or by at least one e-mail message.

16. The electronic album apparatus as claimed in claim 10, wherein at least one image file or at least one audio file stored in a separately provided folder is copied and stored in the album folder.

17. The electronic album apparatus as claimed in claim 10, the first duration is determined by the length of the audio file and the second duration is set by a user.

18. The electronic album apparatus as claimed in claim 10, the control unit controls the display unit or the audio output unit to replay files that have not been completely replayed among the image files and the audio files if the repeat command is not received.

19. An electronic album apparatus comprising:
a data memory which stores an album folder created in a predetermined position to execute a function of an electronic story album;
a display unit which displays the album folder;
a manipulating unit which receives a predetermined command to execute the function of the electronic story album;
a decoding unit which decodes an image file and an audio file;
a signal processing unit which converts the image file and audio file output from the decoding unit into signals able to be output;
a signal output unit which outputs an image and audio according to the type of signal output from the signal processing unit; and
a control unit which, if the manipulating unit receives the predetermined command, determines whether both an image file and an audio file are stored in the album folder, and, if it is determined that both the image file and the audio file are stored in the album folder, controls the display unit, the decoding unit, the signal processing unit and the signal output unit such that the image file stored in the album folder is replayed and an image corresponding to the image file is displayed for a second duration and the audio file stored in the album folder is replayed at the same time for a first duration, wherein the first duration is independent of the second duration, wherein the controller controls the signal output unit to replay image files stored in the album folder and to replay audio files stored in the album folder, and wherein the controller determines whether the image files or the audio files have been completely replayed, and controls the signal output unit to provide a message asking whether to replay the image files or the audio files that have been completely replayed again from the start if it is determined that the image files or the audio files have been completely replayed, and if a repeat command is received, the controller controls the signal output unit to replay the image files or the audio files that have been completely replayed again from the start.

20. The electronic album apparatus as claimed in claim 19, the predetermined command is received through a predetermined hot key or a predetermined on-screen-display (OSD) menu.

21. The electronic album apparatus as claimed in claim 19, the first duration is determined by the length of the audio file and the second duration is set by a user.

22. The electronic album apparatus as claimed in claim 19, the control unit controls the signal output unit to replay files that have not been completely replayed among the image files and the audio files if the repeat command is not received.

* * * * *